US012494154B2

(12) United States Patent
Oh

(10) Patent No.: US 12,494,154 B2
(45) Date of Patent: Dec. 9, 2025

(54) GATE DRIVER AND DISPLAY DEVICE INCLUDING THE SAME

(71) Applicant: LG DISPLAY CO., LTD., Seoul (KR)

(72) Inventor: Chungwan Oh, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/817,794

(22) Filed: Aug. 28, 2024

(65) Prior Publication Data

US 2025/0201167 A1 Jun. 19, 2025

(30) Foreign Application Priority Data

Dec. 15, 2023 (KR) ........................ 10-2023-0182726

(51) Int. Cl.
*G09G 3/20* (2006.01)
*G09G 3/32* (2016.01)
*G09G 3/3266* (2016.01)

(52) U.S. Cl.
CPC ............. *G09G 3/2092* (2013.01); *G09G 3/32* (2013.01); *G09G 3/3266* (2013.01); *G09G 2310/0267* (2013.01); *G09G 2310/0286* (2013.01); *G09G 2310/061* (2013.01); *G09G 2320/02* (2013.01); *G09G 2320/0214* (2013.01); *G09G 2340/0435* (2013.01)

(58) Field of Classification Search
CPC ......... G09G 3/2092; G09G 2310/0267; G09G 2310/0286; G09G 2320/02; G09G 2340/0435; G09G 3/3266; G09G 3/32; G09G 2310/061; G09G 2320/0214
See application file for complete search history.

(56) References Cited

U.S. PATENT DOCUMENTS

2017/0294165 A1* 10/2017 Park ..................... G09G 3/3266
2024/0395195 A1* 11/2024 Ke ........................... G09G 3/32

FOREIGN PATENT DOCUMENTS

KR 20220093764 A * 7/2022 ........... G09G 3/3266
KR 10-2023-0044068 A 4/2023

* cited by examiner

*Primary Examiner* — Adam J Snyder
(74) *Attorney, Agent, or Firm* — Fish & Richardson P.C.

(57) ABSTRACT

In one aspect, a display device includes a plurality of stage circuits configured to output gate signals to gate lines in response to a gate clock signal. Each stage circuit includes an output unit configured to output a first level voltage or a second level voltage to one of the gate lines according to a corresponding voltage at a Q node and a QB node; an input unit configured to control a voltage at a Q1 node according to a gate start signal or a carry signal output from a previous stage circuit in response to the gate clock signal; a Q node controller configured to control the voltage at the Q node according to the voltage at the Q1 node; and a QB node controller configured to control the voltage at the QB node according to the voltage at the Q1 node and the voltage at the Q node.

16 Claims, 10 Drawing Sheets

ST

GATE DRIVER AND DISPLAY DEVICE INCLUDING THE SAME

CROSS-REFERENCE TO RELATED APPLICATIONS

The present application claims priority to Korean Patent Application No. 10-2023-0182726, filed on Dec. 15, 2023, the entire contents of which is incorporated herein for all purposes by this reference.

BACKGROUND

Field of the Disclosure

The present specification relates to a gate driver and a display device including the same.

Background

Recently, in display devices, a technology of driving pixels at low speeds to reduce consumed power when there is little change in input image has been developed.

When a display panel is driven at a low speed for a long time, a voltage at a specific node in a gate driver may be increased by current leakage and noise during a skip period. Such an increase in node voltage may reduce a driving force of the gate driver and cause poor image quality.

SUMMARY

Embodiments of the present specification are directed to providing a gate driver in which an increase in a Q node voltage may be prevented and the Q node voltage may be stably maintained by minimizing a leakage current to the Q node and filtering noise, and a display device including the same.

However, the objects of the present specification are not limited to the above-described object, and other technical objects may be inferred from embodiments below.

In one aspect, a display device includes a plurality of stage circuits configured to output gate signals to gate lines in response to a gate clock signal. Each of the plurality of stage circuits includes an output unit configured to output a first level voltage or a second level voltage to one of the gate lines according to a corresponding voltage at a Q node and a corresponding voltage at a QB node; an input unit configured to control a voltage at a Q1 node according to a gate start signal or a carry signal output from a previous stage circuit in response to the gate clock signal; a Q node controller configured to control the voltage at the Q node according to the voltage at the Q1 node; a QB node controller configured to control the voltage at the QB node according to the voltage at the Q1 node and the voltage at the Q node; and a reset unit configured to set the Q1 node to the second level voltage in response to the voltage at the Q node.

In another aspect, the reset unit includes a first transistor having a first electrode connected to the second level voltage, a second electrode connected to the Q1 node, and a gate electrode connected to the Q node.

In another aspect, the Q node controller includes a second transistor connected between the Q1 node and the Q node and having a gate electrode connected to the second level voltage.

In another aspect, as the second level voltage is applied to the Q1 node through the first transistor, a gate-source voltage of the second transistor is set to 0 V, and the voltage at the Q node is maintained at the second level voltage.

In another aspect, the first transistor is configured to remove noise applied to the Q1 node through the gate start pulse or the carry signal at the second level voltage.

In another aspect, the output unit includes a third transistor configured to output the second level voltage to the one of the gate lines according to the voltage at the Q node; and a fourth transistor configured to output the first level voltage to the one of the gate lines according to the voltage at the QB node.

In another aspect, the output unit includes a first capacitor connected between the Q node and the one of the gate lines; and a second capacitor connected between the QB node and the first level voltage.

In another aspect, the QB node controller includes a fifth transistor configured to set the QB node to the first level voltage according to the voltage at the Q1 node; and a sixth transistor configured to set the QB node to the second level voltage according to the voltage at the Q node.

In another aspect, the input unit includes a seventh transistor having a first electrode connected to the gate start signal or the carry signal, a second electrode connected to the Q1 node, and a gate electrode connected to the gate clock signal.

In another aspect, the first level voltage is higher than the second level voltage.

In one aspect, a display device includes a display panel on which pixels are disposed; a gate driver configured to apply a gate signal to the pixels through a gate line; a data driver configured to apply a data voltage to the pixel through a data line; and a timing controller configured to control operations of the gate driver and the data driver. The gate driver includes a plurality of stage circuits. Each of the plurality of stage circuits includes an output unit configured to output a first level voltage or a second level voltage to the gate line according to a voltage at a Q node and a voltage at a QB node; an input unit configured to control a voltage at a Q1 node according to a gate start signal or a carry signal output from a previous stage circuit in response to a gate clock signal; a Q node controller configured to control the voltage at the Q node according to the voltage at the Q1 node; a QB node controller configured to control the voltage at the QB node according to the voltage at the Q1 node and the voltage at the Q node; and a reset unit configured to set the Q1 node to the second level voltage in response to the voltage at the Q node.

In another aspect, the reset unit includes a first transistor having a first electrode connected to the second level voltage, a second electrode connected to the Q1 node, and a gate electrode connected to the Q node.

In another aspect, the Q node controller includes a second transistor connected between the Q1 node and the Q node and having a gate electrode connected to the second level voltage.

In another aspect, the timing controller is configured to control the gate driver and the data driver to operate in a low-speed driving mode, and the low-speed driving mode is composed of a refresh period during which a new data voltage is programmed to the pixel and a skip period during which the programming is omitted.

In another aspect, the second level voltage is output to the gate line in response to the voltage at the Q node during the skip period of the low-speed driving mode.

In another aspect, during the skip period of the low-speed driving mode, the second level voltage is applied to the Q1 node through the first transistor in response to the voltage at the Q node, a gate-source voltage of the second transistor is set to 0 V, and the voltage at the Q node is maintained at the second level voltage.

In another aspect, the first transistor is configured to remove noise applied to the Q1 node through the gate start pulse or the carry signal at the second level voltage.

In another aspect, the first level voltage is higher than the second level voltage.

In one aspect, a display device includes a plurality of stage circuits configured to output gate signals to gate lines in response to a gate clock signal. Each of the plurality of stage circuits includes an output unit configured to output a voltage to one of the gate lines according to at least one of a corresponding voltage at a Q node and a corresponding voltage at a QB node; an input unit configured to control a voltage at a Q1 node according to a gate start signal or a carry signal output from a previous stage circuit in response to the gate clock signal; a Q node controller configured to control the voltage at the Q node according to the voltage at the Q1 node; a QB node controller configured to control the voltage at the QB node according to the voltage at the Q1 node and the voltage at the Q node; and a reset unit configured to change the voltage at the Q1 node in response to the voltage at the Q node.

In another aspect, the output unit includes a first transistor configured to output a first value as the voltage to the one of the gate lines according to the voltage at the Q node; and a second transistor configured to output a second value as the voltage to the one of the gate lines according to the voltage at the QB node.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
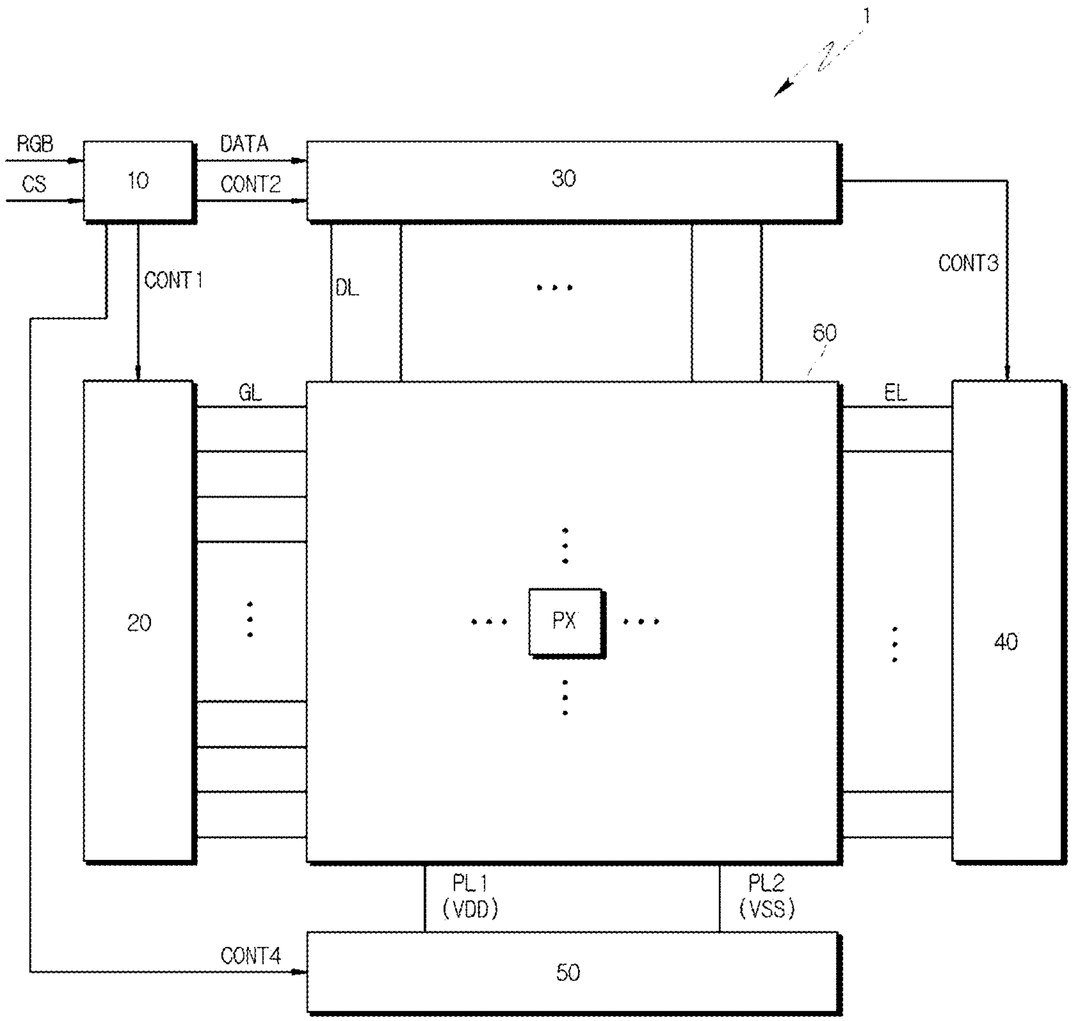
FIG. 1 is a block diagram schematically showing a structure of a display device according to some aspects of the present disclosure.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically showing a structure of a display device according to some aspects of the present disclosure.

Referring to FIG. 1, a display device 1 includes a timing controller 10, a gate driver 20, a data driver 30, an emission driver 40, a power supply unit 50, and a display panel 60.

The timing controller 10 may receive image signals RGB and a control signal CS from an external host system or the like. The image signals RGB may include a plurality of grayscale data. The control signal CS may include, for example, a horizontal synchronization signal, a vertical synchronization signal, a main clock signal, and the like.

The timing controller 10 may process the image signals RGB and the control signal CS according to operating conditions of the display panel 60, and generate and output image data, a gate driving control signal CONT1, a data driving control signal CONT2, an emission driving control signal CONT3, and a power supply control signal CONT4.

The gate driver 20 may generate gate signals based on a gate driving control signal CONT1 output from the timing controller 10. The gate driver 20 may provide the generated gate signals to pixels PX through a plurality of gate lines GL.

The data driver 30 may generate data signals based on the image data and the data driving control signal CONT2 that are output from the timing controller 10. The data driver 30 may provide the generated data signals to the pixels PX through a plurality of data lines DL.

The emission driver 40 may generate emission control signals based on the emission driving control signal CONT3 output from the timing controller 10. The emission driver 40 may provide the generated emission control signals to the pixels PX through a plurality of emission lines EL.

The power supply unit 50 may generate a high potential driving voltage VDD and a low potential driving voltage VSS to be provided to the display panel 60 based on the power supply control signal CONT4. The power supply unit 50 may provide the generated driving voltages VDD and VSS to the pixels PX through the corresponding power lines PL1 and PL2.

The plurality of pixels PX (or referred to as "sub-pixel circuits") are disposed on the display panel 60. The pixels PX may include one or more transistors and a light emitting element connected to the gate line GL and the data line DL. The pixels PX charge a data voltage supplied through the data line DL in response to the gate signal applied through the gate line GL and emits light with a luminance corresponding to the charged data voltage in response to an emission control signal applied through an emission line EL.

In one aspect, each pixel PX may display one of red, green, and blue. In another aspect, each pixel PX may display one of cyan, magenta, and yellow. In various embodiments, each pixel PX may display one of red, green, blue, and white.

The timing controller 10, the gate driver 20, the data driver 30, the emission driver 40, and the power supply unit 50 may each be configured as a separate integrated circuit (IC) or at least a partially integrated IC. In addition, the gate driver 20 and the emission driver 40 may be configured in a gate in panel type formed integrally with the display panel 60. In the present aspect, the gate driver 20 and the emission driver 40 may constitute a gate-in-panel (hereinafter referred to as "GIP").

Figure 2:
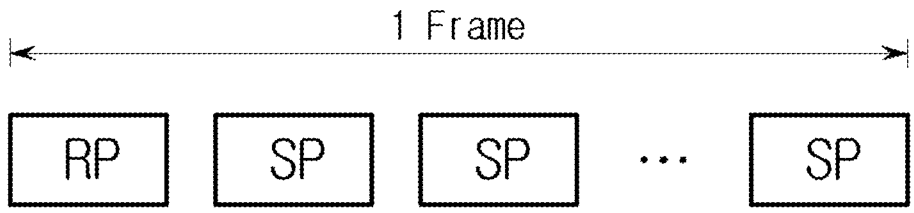
FIG. 2 is a view showing a method of driving the display device according to one some aspects of the present disclosure.

FIG. 2 is a view showing a method of driving the display device according to some aspects of the present disclosure.

In one aspect, the display device 1 may be driven in a variable refresh rate mode in which a driving frequency may be changed. For example, the display device 1 may be driven at a refresh rate that is higher or lower than a predetermined reference refresh rate. When the display device 1 is driven at a rate lower than the reference refresh rate, it may be referred to as "low-frequency driving," and when the display device 1 is driven at a rate higher than the reference refresh rate, it may be referred to as "high-frequency driving." The refresh rate may be determined according to the type of image to be displayed or the like, but is not limited thereto.

Referring to FIGS. 1 and 2 together, the timing controller 10 may generate the control signals CONT1 to CONT4 so that the pixel PX may be driven at various refresh rates. For example, the timing controller 10 may change the refresh rate by changing frequencies of clock signals included in the control signals CONT1 to CONT4, adjusting the timing of the horizontal synchronization signal or the vertical synchronization signal, or driving the gate driver 20 in a mask manner.

For example, the timing controller 10 may analyze image signals RGB transmitted from an external system and activate the low-speed driving when the input image does not change by the predetermined number of frames, that is, when still images are input for a predetermined time or more. Alternatively, the timing controller 10 may activate the low-speed driving when the display device 1 operates in a standby mode or when a user command and/or an input image is not input for a predetermined time or more.

In the variable refresh rate mode, one frame may be configured in a combination of at least one refresh frame RP and at least one skip frame SP.

During the active period RP, each pixel PX may be programmed to a new data voltage, and the light emitting element of the pixel PX may emit light in response to the programmed data voltage Vdata. The refresh period RP may also be referred to as "refresh frame."

A process of applying the new data voltage Vdata to the pixel circuit PX during the skip period SP is omitted. Therefore, the skip period SP may be referred to as a skip frame. In one aspect, during the skip period SP, the light emitting element of each pixel PX may emit light in response to the data voltage Vdata programmed during the previous refresh period RP.

In one aspect, to change the refresh rate, a length of one frame may be changed by adjusting the number or lengths of skip periods SP. Then, the length of the refresh period RP may be sufficiently secured to allow the data voltage Vdata to be stably programmed. However, the present aspect is not limited thereto, and in various other embodiments, the length or number of refresh periods RP may be variably adjusted.

For example, when the driving frequency is 60 Hz in a basic driving mode, the driving frequency may be 1 Hz in the low-speed driving mode. That is, in the basic driving mode, the gate signal may be applied to the pixel PX 60 times per second, and at the same time, the data voltage may be applied 60 times in response thereto to change the image 60 times, and in the low-speed driving mode, the gate signal is applied to the pixel PX 60 times per second, and at the same time, the data voltage is applied once in response thereto, and an image corresponding to the previously stored data voltage may be displayed for the remaining period.

Figure 3:
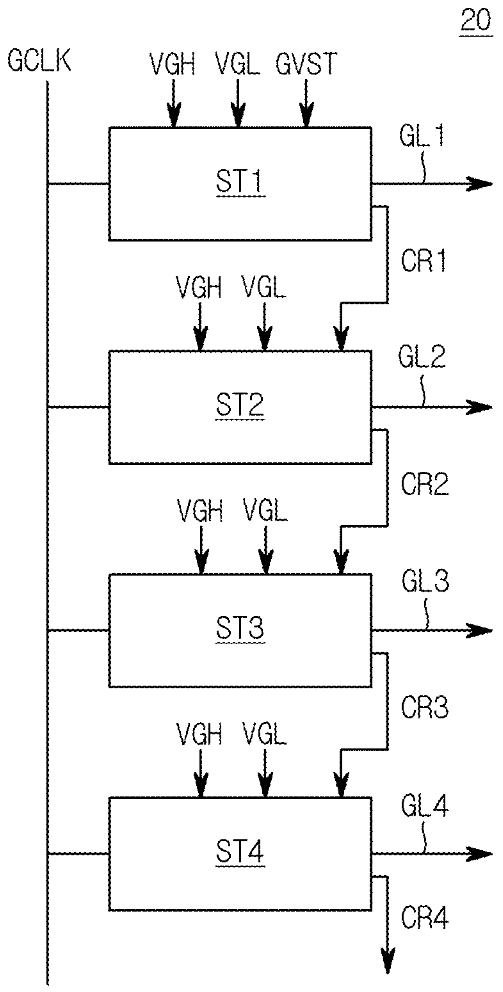
FIG. 3 is a block diagram schematically showing a structure of a gate driver according to some aspects of the present disclosure.

FIG. 3 is a block diagram schematically showing a structure of a gate driver according to some aspects of the present disclosure.

Referring to FIG. 3, the gate driver 20 may include a plurality of stage circuits ST1 to ST4. For convenience of description, FIG. 3 shows the four stage circuits ST1 to ST4 included in the gate driver 20.

The second stage circuit ST2 may be dependently connected to the first stage circuit ST1, the third stage circuit ST3 may be dependently connected to the second stage circuit ST2, and the fourth stage circuit ST4 may be dependently connected to the third stage circuit ST3. The first to fourth stage circuits ST1 to ST4 may have substantially the same configuration.

The stage circuits ST1 to ST4 may be connected one-to-one to the corresponding gate lines GL1 to GL4 and may output gate signals in response to a gate clock signal GCLK.

The first stage circuit ST1 may receive a gate start signal GVST. In addition, the second to fourth stage circuits ST2 to ST4 may each receive a carry signal (i.e., one of first to third carry signals CR1 to CR3) output from the previous stage circuits ST1 to ST3. For example, the second stage circuit ST2 may receive the first carry signal CR1 output from the first stage circuit ST1, the third stage circuit ST3 may receive the second carry signal CR2 output from the second stage circuit ST2, and the fourth stage circuit ST4 may receive the third carry signal CR3 output from the third stage circuit ST3.

The gate clock signal GCLK may be a square wave signal in which a gate-on voltage and a gate-off voltage alternate every 1 horizontal period (1H).

Additionally, power voltages VGH and VGL necessary for driving the stage circuits ST1 to ST4 may be applied to the stage circuits ST1 to ST4. For example, the gate on voltage VGH, which is a first level voltage, and the gate off voltage VGL, which is a second level voltage, may be applied to the stage circuits ST1 to ST4. The gate on voltage VGH and the gate off voltage VGL may have DC voltage levels. The gate on voltage VGH is a voltage for turning on transistors provided in the pixel PX, and the gate off voltage VGL is a voltage for turning off the transistors provided in the pixel PX, and in one aspect, the voltage level of the gate on voltage VGH may be set to be higher than the voltage level of the gate off voltage VGL. That is, the first level voltage may be higher than the second level voltage.

When the types of transistors provided in the pixel PX and transistors provided in the stage circuit ST are the same, the transistors of the stage circuit ST may be turned on according to the gate on voltage VGH, and the transistors of the stage circuit ST may be turned off according to the gate off voltage VGL. Conversely, when the types of the transistors provided in the pixel PX and the transistors provided in the stage circuit ST are not the same, the transistors in the stage circuit ST may be turned off according to the gate on voltage VGH, and the transistors of the stage circuit ST may be turned on according to the gate off voltage VGL. Therefore, a predetermined transistor is not necessarily turned on by the gate on voltage VGH, and a predetermined transistor is not necessarily turned off by the gate off voltage VGL. That is, the predetermined transistor may be turned off in response to the gate on voltage VGH, and the predetermined transistor may be turned on in response to the gate off voltage VGL.

The stage circuits ST1 to ST4 may output the gate signals. The gate signals output from the stage circuits ST1 to ST4 may be provided to the corresponding gate lines GL1 to GLA, respectively.

The stage circuits ST1 to ST4 may further output the carry signals CR1 to CR4. The carry signals CR1 to CR4 output from the stage circuits ST1 to ST4 may be provided to the next stage circuits ST2 to ST4, respectively. For example, the first carry signal CR1 output from the first stage circuit ST1 may be provided to the second stage circuit ST2, the second carry signal CR2 output from the second stage circuit ST2 may be provided to the third stage circuit ST3, the third carry signal CR3 output from the third stage circuit ST3 may be provided to the fourth stage circuit ST4, and the fourth carry signal CR4 output from the fourth stage circuit ST4 may be provided to a fifth stage circuit (not shown).

The stage circuits ST1 to ST4 included in the gate driver 20 may have substantially the same configuration excluding the type of receiving signal. For example, the first stage circuit ST1, which is the first stage circuit for receiving the gate start signal GVST, and the remaining stage circuits (e.g., the second to fourth stage circuits ST2 to ST4) for receiving the carry signals CR1 to CR4 of the previous stage circuit may have substantially the same circuit configuration excluding the receiving input signal (i.e., the gate start signal GVST or the carry signal CR1 to CR4 of the previous stage circuit) and may be operated in substantially the same manner.

Figure 4:
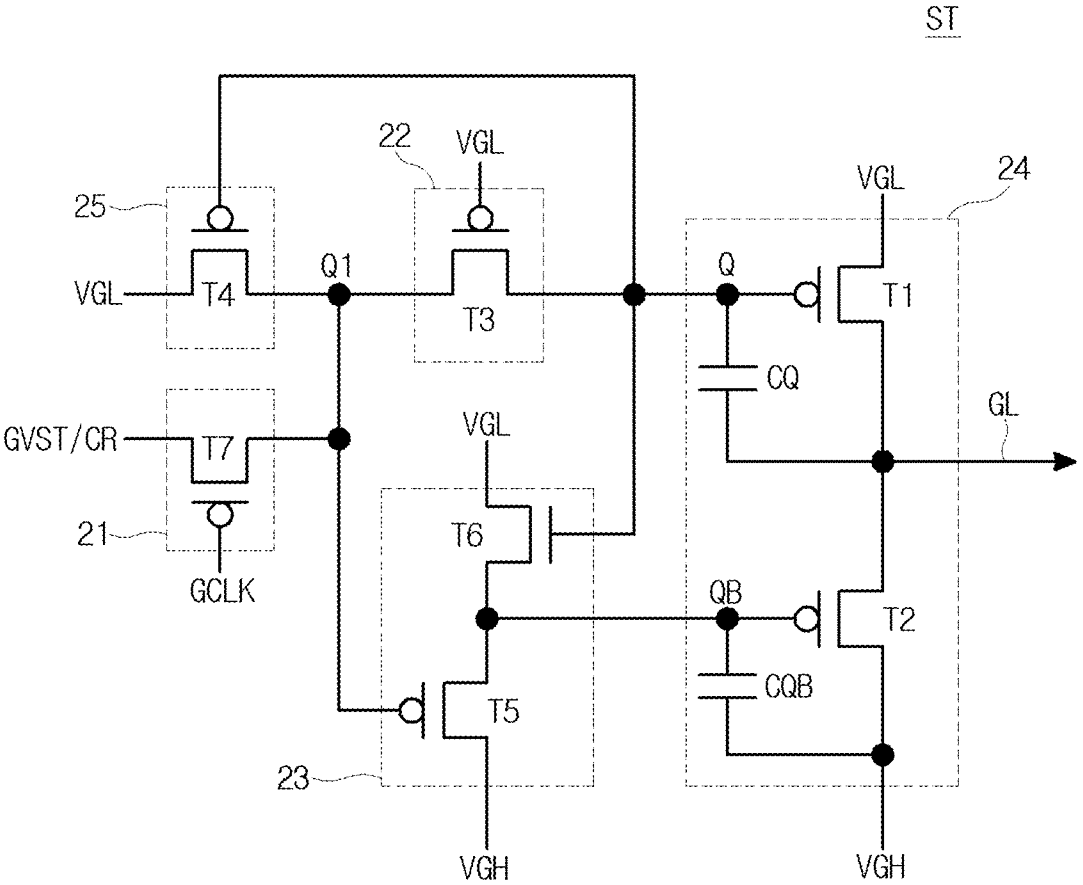
FIG. 4 is a circuit diagram showing a structure of a stage circuit according to some aspects of the present disclosure.

FIG. 4 is a circuit diagram showing a structure of a stage circuit according to some aspects of the present disclosure.

Referring to FIG. 4, the stage circuit ST according to one aspect may include an input unit 21, a Q node controller 22, a QB node controller 23, and an output unit 24.

The output unit 24 outputs the gate off voltage VGL or the gate on voltage VGH to the gate line GL according to the voltages at the Q node Q and the QB node QB. The output unit 24 may include a first transistor T1 for outputting the gate off voltage VGL to the gate line GL according to the voltage at the Q node Q and a second transistor T2 for outputting the gate on voltage VGH to the gate line GL according to according to the voltage at the QB node QB.

The first transistor T1 has one electrode formed to receive the gate off voltage VGL and the other electrode connected to the gate line GL. A gate electrode of the first transistor T1 is connected to the Q node Q. The first transistor T1 may be turned on according to the voltage at the Q node Q to output the gate off voltage VGL to the gate line GL as the gate signal.

The second transistor T2 has one electrode formed to receive the gate on voltage VGH and the other electrode connected to the gate line GL. The gate electrode of the second transistor T2 is connected to the QB node QB. The second transistor T2 may be turned on according to the voltage at the QB node QB to output the gate on voltage VGH to the gate line GL as the gate signal.

In one aspect, the gate signal may be provided to at least one transistor provided in the pixel PX to drive the pixel PX. When the transistor of the pixel PX is an n-type transistor, the gate on voltage VGH may be a turn-on voltage, and the gate off voltage VGL may be a turn-off voltage. Conversely, when the transistor of the pixel PX is a p-type transistor, the gate on voltage VGH may be a turn-off voltage and the gate off voltage VGL may be a turn-on voltage. Hereinafter, it is assumed that the transistor of the pixel PX that receives the gate signal from the stage circuit ST is an n-type transistor.

The output unit 24 may further include a first capacitor CQ connected between the Q node Q and the gate line GL and a second capacitor CQB connected between the QB node QB and the gate on voltage VGH. The first capacitor CQ and the second capacitor CQB may stably maintain the gate-source voltages Vgs of the first transistor T1 and the second transistor T2 while the first transistor T1 and the second transistor T2 are turned on.

The Q node controller 22 controls the voltage at the Q node Q according to the voltage at the Q1 node Q1. The Q node controller 22 includes a third transistor T3 connected between the Q1 node Q1 and the Q node Q. A gate electrode of the third transistor T3 is configured to receive the gate off voltage VGL. The third transistor T3 maintains the turn-on state in response to the gate off voltage VGL and transmits the voltage at the Q1 node Q1 to the Q node Q.

The QB node controller 23 controls the voltage at the QB node QB according to the voltage at the Q1 node Q1 and the voltage at the Q node Q. The QB node controller 23 may include a fifth transistor T5 for setting the QB node QB to the gate on voltage VGH according to the voltage at the Q1 node Q1 and a sixth transistor T6 for setting the QB node QB to the gate off voltage VGL according to the voltage at the Q node Q.

The fifth transistor T5 has one electrode formed to receive the gate on voltage VGH and the other electrode connected to the QB node QB. A gate electrode of the fifth transistor T5 is connected to the Q1 node Q1. The fifth transistor T5 may be turned on according to the voltage at the Q1 node Q1 to set the QB node QB to the gate on voltage VGH.

The sixth transistor T6 has one electrode formed to receive the gate off voltage VGL and the other electrode connected to the QB node QB. A gate electrode of the sixth transistor T6 is connected to the Q node Q. The sixth transistor T6 may be turned on according to the voltage at the Q node Q to set the QB node QB to the gate-off voltage VGL.

The input unit 21 controls the voltage at the Q1 node Q1 according to the gate start signal GVST (in the case of the first stage circuit ST1) or the carry signal CR output from the previous stage circuit in response to the gate clock signal GCLK. The input unit 21 includes a seventh transistor T7 having one electrode formed to receive the gate start signal GVST or the carry signal CR output from the previous stage circuit and the other electrode connected to the Q1 node Q1. A gate electrode of the seventh transistor T7 is configured to receive the gate clock signal GCLK. The seventh transistor T7 may be turned on when receiving the gate clock signal GCLK at the turn-on level to transmit the gate start signal GVST or the carry signal CR to the Q1 node Q1.

The stage circuit ST according to one aspect further includes a reset unit 25 for setting the gate off voltage VGL to the Q1 node Q1 according to the voltage at the Q node Q. The reset unit 25 includes a fourth transistor T4. The fourth transistor T4 may be a reset transistor. The fourth transistor T4 may reset the voltage at the Q1 node Q1 controlled by the seventh transistor T7 to the gate off voltage VGL.

The fourth transistor T4 has one electrode formed to receive the gate off voltage VGL and the other electrode connected to the Q1 node Q1. A gate electrode of the fourth transistor T4 is connected to the Q node Q. The fourth transistor T4 may be turned on according to the voltage at the Q node Q to set the gate-off voltage VGL to the Q1 node Q1.

The fourth transistor T4 is turned on when the Q node Q is set to the gate off voltage VGL to apply the gate off voltage VGL to the Q1 node Q1, that is, one electrode (e.g., a source electrode) of the third transistor T3. When the gate off voltage VGL is applied to the Q1 node Q1, the gate-source voltage Vgs of the third transistor T3 becomes 0 V, and the third transistor T3 is in an off-current state to block current leakage. Therefore, it is possible to prevent an increase in the voltage at the Q node Q that occurs when a current leaks from the third transistor T3.

When the voltage at the Q node Q is stabilized, the gate-source voltage Vgs of the first transistor T1 connected to the Q node Q does not change or the change is minimized, and thus the gate off voltage VGL may be stably output to the gate line GL.

In particular, during the low-speed driving in which the gate signal should be maintained at the gate off voltage VGL for a long time, the third transistor T3 may stabilize the voltage at the Q node Q as the gate off voltage VGL, thereby stabilizing the gate signal, improving the reliability of the low-speed driving, and prevent poor image quality.

In addition, noise applied to the Q1 node Q1 from the gate start signal GVST or the previous stage circuit is removed by resetting the voltage at the Q1 node Q1 to the gate off voltage VGL when the seventh transistor T7 is turned on. That is, the seventh transistor T7 may serve as a noise filter. Through the seventh transistor T7, the gate driver 20 may be robust against noise and may have high reliability.

In the aspect shown in FIG. 4, the transistors of the stage circuit ST may be p-type transistors and may be low temperature polysilicon (LTPS) thin film transistors. The LTPS thin film transistor includes a gate electrode, a source electrode, and a drain electrode. The LTPS thin film transistor has an active layer made of polysilicon. The LTPS thin film transistor has high electron mobility, and thus has fast driving characteristics. The LTPS thin film transistor may be formed of a p-type thin film transistor or an n-type thin film transistor. Therefore, in another aspect, the transistors may be n-type transistors.

In one aspect, at least some of the transistors of the stage circuit ST may be n-type transistors. For example, the sixth transistor T6 is an n-type transistor and may be formed of an oxide semiconductor thin film transistor. The oxide semiconductor thin film transistor includes a gate electrode, a source electrode, and a drain electrode. The oxide semiconductor thin film transistor has an active layer formed of an oxide semiconductor. Here, the oxide semiconductor may be set to an amorphous or crystalline oxide semiconductor. The oxide semiconductor thin film transistor may be formed as an n-type transistor. The oxide semiconductor thin film transistor may be processed at low temperatures and has lower charge mobility than a low temperature poly-silicon (LTPS) thin film transistor. The oxide semiconductor thin film transistor has excellent off-current characteristics.

However, the type of transistor is not limited to those described above, and various modifications are possible without departing from the technical spirit.

Figure 5:
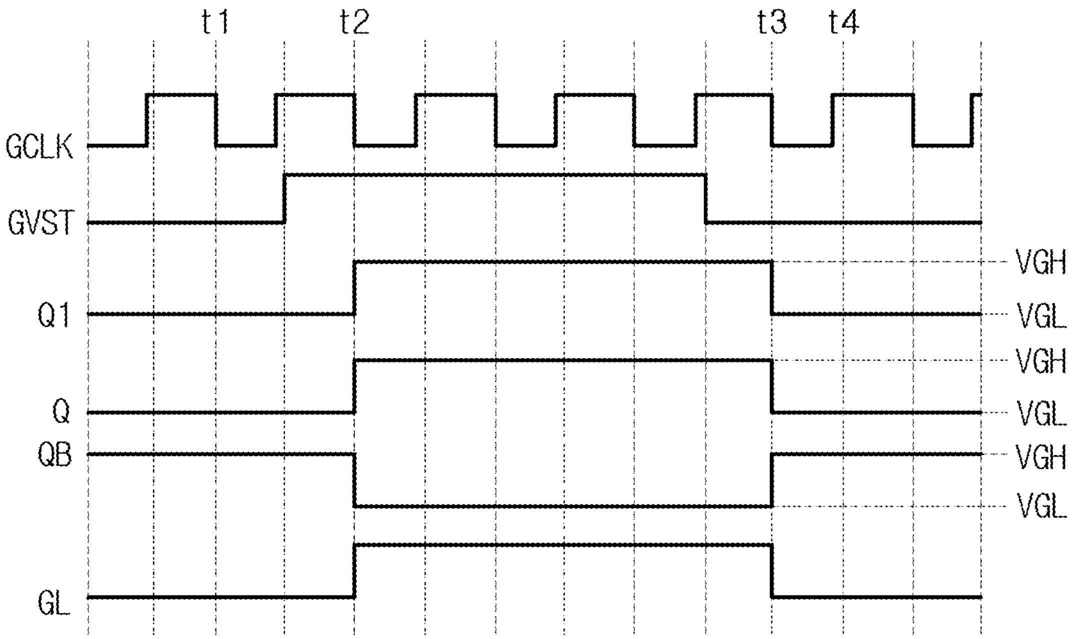
FIG. 5 is a waveform diagram of signals applied to the stage circuit of FIG. 4 according to some aspects of the present disclosure.

FIG. 5 is a waveform diagram of signals applied to the stage circuit of FIG. 4 according to some aspects of the present disclosure. FIGS. 6 to 9 are views for describing an operation of the stage circuit of FIG. 4 according to some aspects of the present disclosure.

Figure 6:
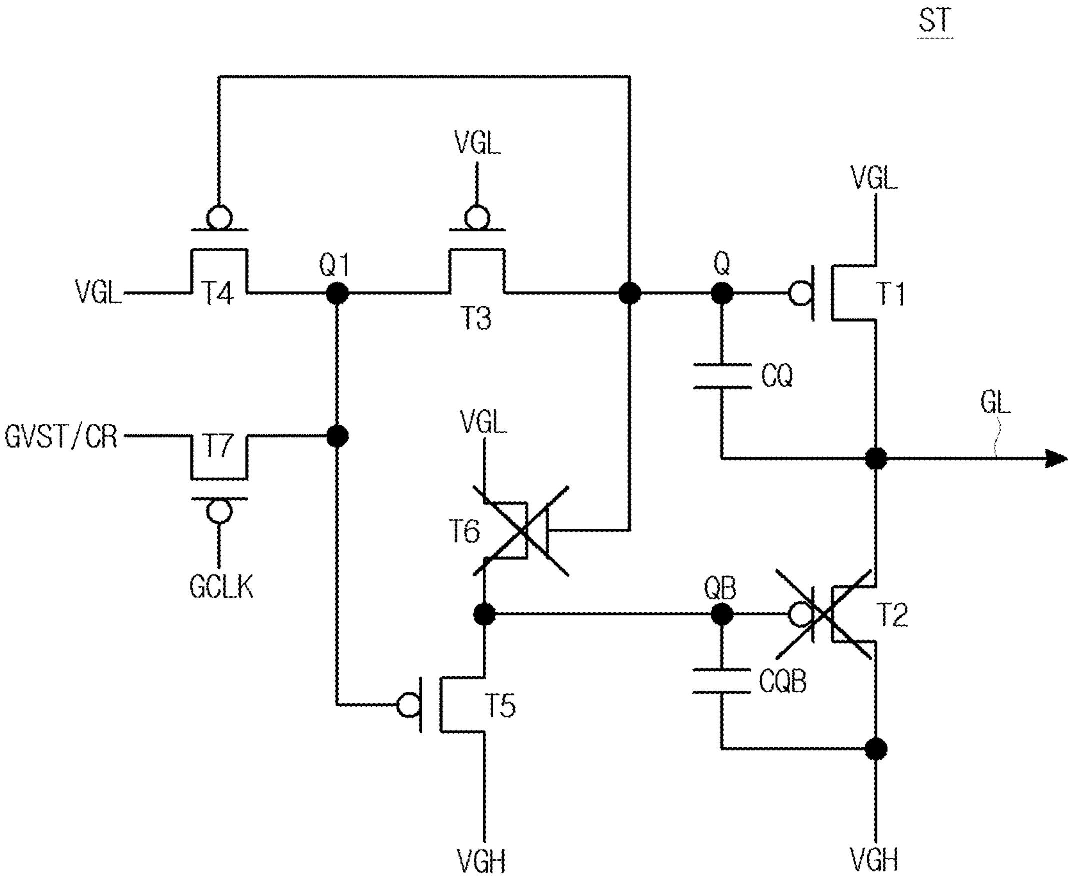
FIGS. 6 to 9 are views for describing an operation of the stage circuit of FIG. 4 according to some aspects of the present disclosure.

Referring to FIGS. 5 and 6 together, the gate clock signal GCLK at a low level and the gate start signal GVST or the carry signal CR at the low level are applied to the stage circuit ST at a first time point t1 after the gate driver 20 is driven. Therefore, the seventh transistor T7 is turned on to apply the low level voltage to the Q1 node Q1.

The fifth transistor T5 is turned on in response to the voltage at the Q1 node Q1. Then, the gate on voltage VGH is transmitted to the QB node QB. In response to the voltage at the QB node QB, the second transistor T2 is turned off.

In addition, the low level voltage at the Q1 node Q1 is transmitted to the Q node Q through the third transistor T3 in the turned-on state. Therefore, the first transistor T1 is turned on, the fourth transistor T4 is turned on, and the sixth transistor T6 is turned off. As the first transistor T1 is turned on, the gate off voltage VGL may be output to the gate line GL through the first transistor T1.

Figure 7:
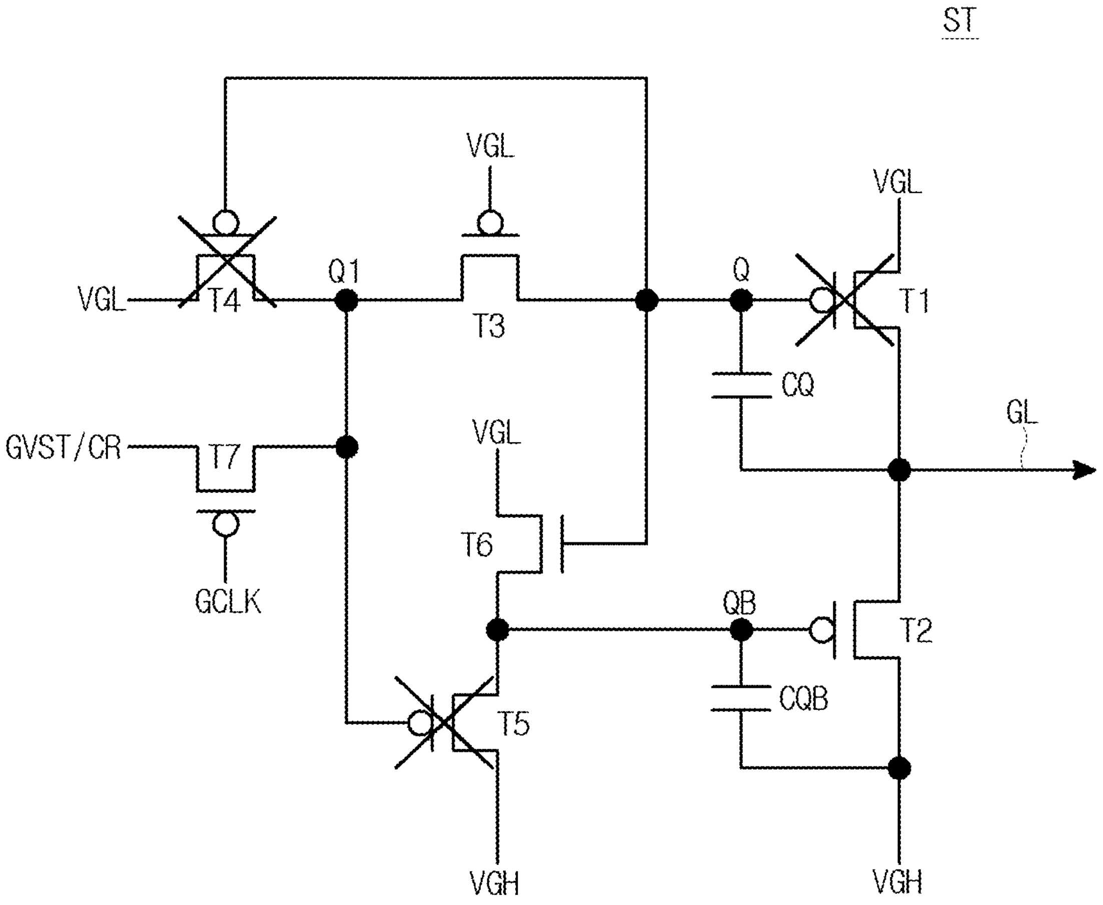

Referring to FIGS. 5 and 7 together, the gate clock signal GCLK at the low level and the gate start signal GVST or the carry signal CR at the high level are applied to the stage circuit ST at a second time point t2. Therefore, the seventh transistor T7 is turned on to apply the high level voltage to the Q1 node Q1.

The fifth transistor T5 is turned off in response to the voltage at the Q1 node Q1. In addition, the high level voltage at the Q1 node Q1 is transmitted to the Q node Q through the third transistor T3 in the turned-on state. Therefore, the first transistor T1 is turned off, the fourth transistor T4 is turned off, and the sixth transistor T6 is turned on. As the sixth transistor T6 is turned on, the gate off voltage VGL is transmitted to the QB node QB.

In response to the voltage at the QB node QB, the second transistor T2 is turned on. Then, the gate on voltage VGH may be output to the gate line GL through the second transistor T2. While the gate start signal GVST or the carry signal CR maintains the high level, a gate signal of the gate on voltage VGH is output to the gate line GL. For example, during a programming period during which the data voltage Vdata is programmed to the pixel PX, the gate signal of the gate on voltage VGH may be output to the gate line GL to turn on an n-type transistor (e.g., a switching transistor) of the pixel PX.

Figure 8:
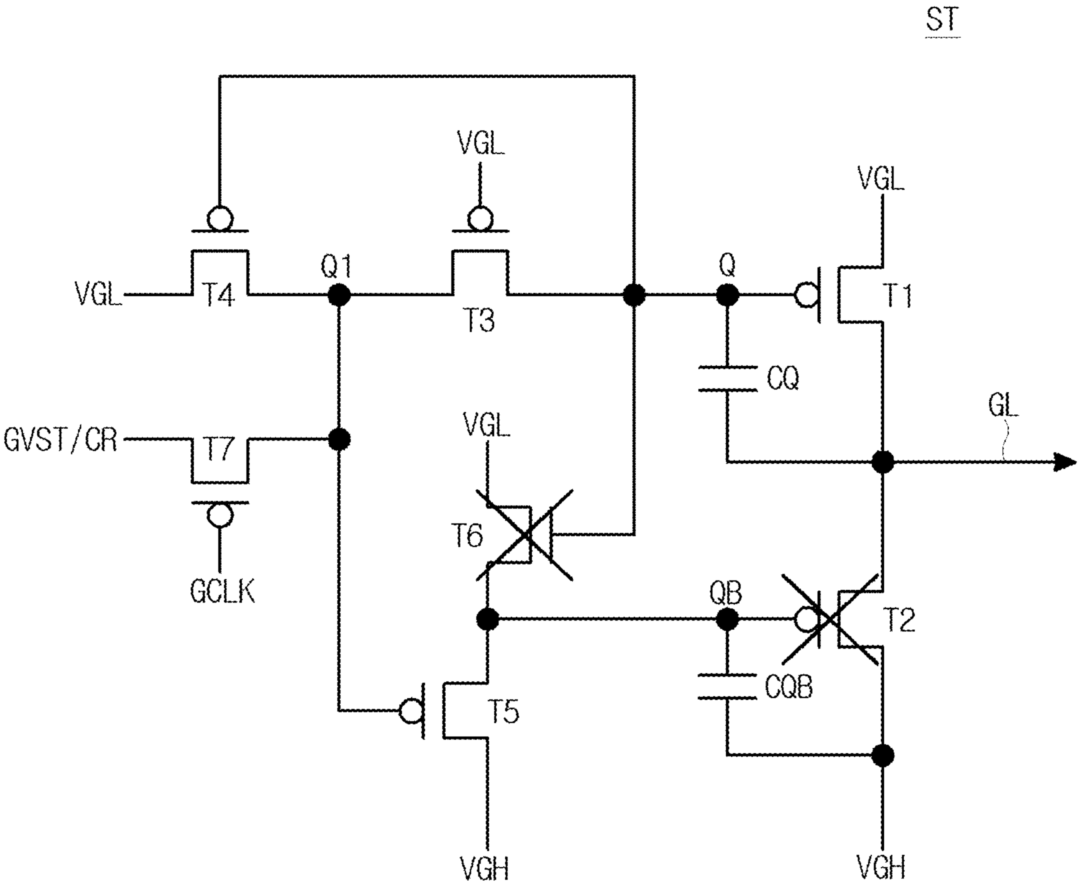

Referring to FIGS. 5 and 8 together, the gate clock signal GCLK at the low level and the gate start signal GVST or the carry signal CR at the low level are applied to the stage circuit ST at a third time point t3. Therefore, the seventh transistor T7 is turned on to apply the low level voltage to the Q1 node Q1.

The fifth transistor T5 is turned on in response to the voltage at the Q1 node Q1. Then, the gate on voltage VGH is transmitted to the QB node QB. In response to the voltage at the QB node QB, the second transistor T2 is turned off.

In addition, the low level voltage at the Q1 node Q1 is transmitted to the Q node Q through the third transistor T3 in the turned-on state. Therefore, the first transistor T1 is turned on, the fourth transistor T4 is turned on, and the sixth transistor T6 is turned off. As the first transistor T1 is turned on, the gate off voltage VGL may be output to the gate line GL through the first transistor T1.

In this case, the gate off voltage VGL is transmitted to the Q1 node Q1 through the fourth transistor T4 in the turn-on state. That is, the voltage at the Q1 node Q1 is reset to the gate off voltage VGL through the fourth transistor T4. Therefore, noise in the gate start signal GVST or the carry signal CR transmitted to the Q1 node Q1 during the previous period may be removed.

Figure 9:
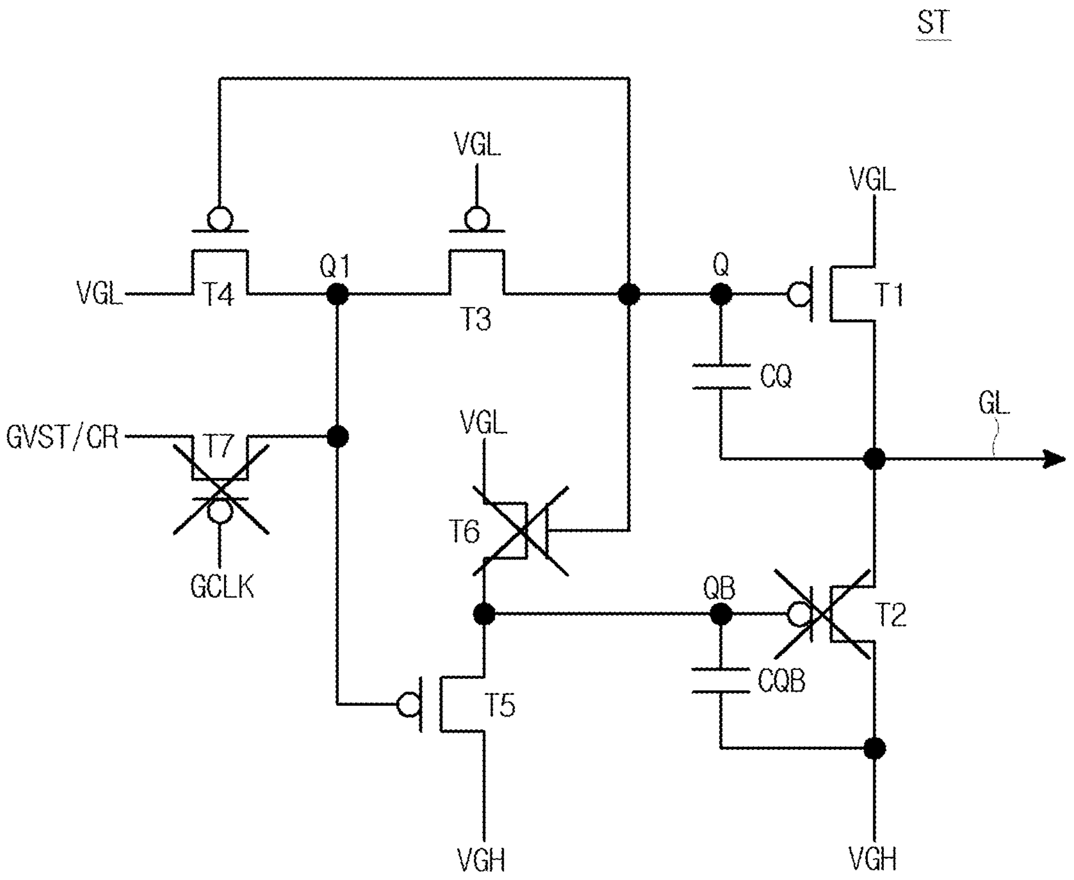

Referring to FIGS. 5 and 9 together, the gate clock signal GCLK at the high level and the gate start signal GVST or the carry signal CR at the low level are applied to the stage circuit ST at a fourth time point t4. Therefore, the seventh transistor T7 is turned off.

While the gate start signal GVST or the carry signal CR is maintained at the low level, the gate off voltage VGL is output to the gate line GL through the first transistor T1. For example, during the remaining period excluding the programming period during which the data voltage Vdata is programmed to the pixel PX, the gate signal of the gate off voltage VGL may be output to the gate line GL to turn off the n-type transistor (e.g., the switching transistor) of the pixel PX.

While the display device 1 operates in the low-speed driving mode, the data voltage Vdata is not programmed to the pixel PX, and thus the gate signal at the turn-off level is continuously output to the gate line GL. As the length of the skip period SP (see FIG. 2) increases, the turn-off period of the gate signal may increase.

Figure 10:
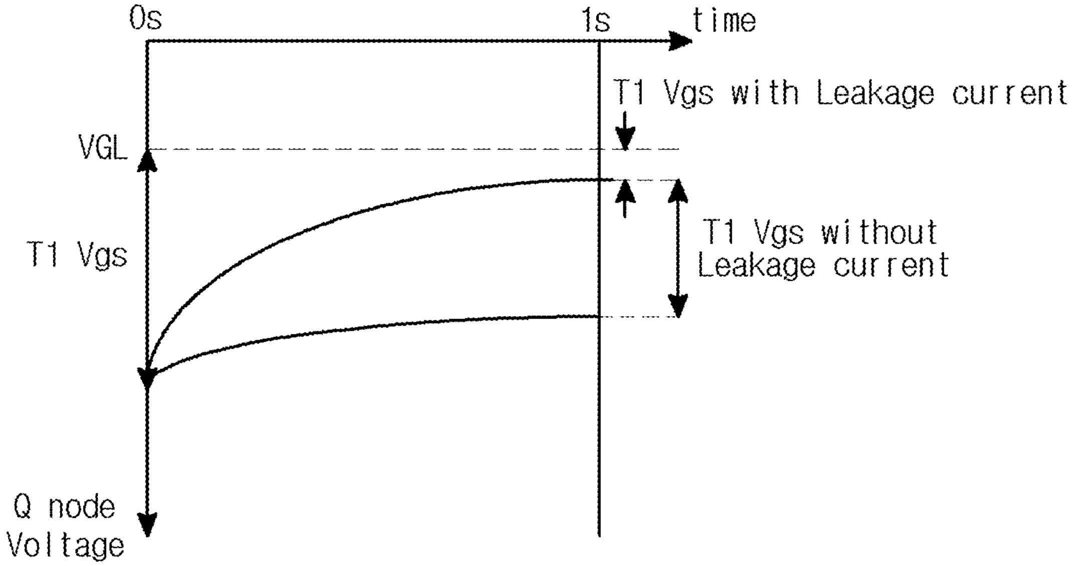
FIG. 10 is a graph showing a change in Q node voltage due to current leakage in the stage circuit of FIG. 4 according to some aspects of the present disclosure.

FIG. 10 is a graph showing a change in Q node voltage due to current leakage in the stage circuit of FIG. 4 according to some aspects of the present disclosure.

Referring back to FIGS. 4 and 5, to output the gate signal of the gate off voltage VGL during the skip period SP, the Q node Q of the stage circuit ST should be maintained at the low level. As the length of the skip period SP increases, current leakage may occur through the third transistor T3, and the voltage of the Q node Q may gradually increase as shown in FIG. 10. Then, the gate-source voltage Vgs of the first transistor T1 decrease, and a sufficiently low gate off voltage VGL may not be provided to the gate line GL, thereby causing display defects on the display panel 60.

In the aspect of FIG. 4, the gate off voltage VGL is applied to the Q1 node Q1 through the fourth transistor T4 in the turned-on state during the skip period SP. While the Q node Q is maintained at the low voltage, the fourth transistor T4 may set the gate-source voltage Vgs of the third transistor T3 to 0 V by setting the Q1 node Q1 to the gate off voltage VGL. Therefore, it is possible to minimize the leakage current caused by the third transistor T3 and maintaining the voltage at the Q node Q at the low voltage without any increase.

When the voltage at the Q node Q is stably maintained, as shown in FIG. 10, the change in gate-source voltage Vgs of the first transistor T1 may be eliminated or minimized, and as a result, the gate off voltage VGL may be stably output to the gate line GL.

According to the gate driver and the display device including the same according to the embodiments, it is possible to prevent the increase in the voltage at the specific node in the gate driver even when the low-speed driving is maintained for a long time, thereby maintaining the stable output.

According to the gate driver and the display device including the same according to the embodiments, it is possible to prevent poor image quality.

Although the embodiments of the present disclosure have been described above with reference to the accompanying drawings, those skilled in the art to which the present disclosure pertains will be able to understand that the above-described technical configuration of the present disclosure may be carried out in other specific forms without changing the technical spirit or essential features thereof. Therefore, it should be understood that the above-described embodiments are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A display device comprising:

a plurality of stage circuits configured to output gate signals to gate lines in response to a gate clock signal, wherein each of the plurality of stage circuits includes:

an output unit configured to output a first level voltage or a second level voltage to one of the gate lines according to a corresponding voltage at a Q node and a corresponding voltage at a QB node;

an input unit configured to control a voltage at a Q1 node according to a gate start signal or a carry signal output from a previous stage circuit in response to the gate clock signal;

a Q node controller configured to control the voltage at the Q node according to the voltage at the Q1 node;

a QB node controller configured to control the voltage at the QB node according to the voltage at the Q1 node and the voltage at the Q node; and a reset unit configured to set the Q1 node to the second level voltage in response to the voltage at the Q node, wherein the reset unit includes a first transistor having a first electrode connected to the second level voltage, a second electrode directly connected to the Q1 node, and a gate electrode connected to the Q node, wherein the Q node controller includes a second transistor connected between the Q1 node and the Q node and having a gate electrode connected to the second level voltage, and wherein the first transistor is turned on in response to the voltage of the Q node and controls a gate-source voltage of the second transistor which controls the voltage of the Q node.

2. The display device of claim 1, wherein, as the second level voltage is applied to the Q1 node through the first transistor, the gate-source voltage of the second transistor is set to 0 V, and the voltage at the Q node is maintained at the second level voltage.

3. The display device of claim 1, wherein the first transistor is configured to remove noise applied to the Q1 node through a gate start pulse or the carry signal at the second level voltage.

4. The display device of claim 1, wherein the output unit comprises:

a third transistor configured to output the second level voltage to the one of the gate lines according to the voltage at the Q node; and a fourth transistor configured to output the first level voltage to the one of the gate lines according to the voltage at the QB node.

5. The display device of claim 4, wherein the output unit comprises:

a first capacitor connected between the Q node and the one of the gate lines; and a second capacitor connected between the QB node and the first level voltage.

6. The display device of claim 1, wherein the QB node controller comprises:

a fifth transistor configured to set the QB node to the first level voltage according to the voltage at the Q1 node; and a sixth transistor configured to set the QB node to the second level voltage according to the voltage at the Q node.

7. The display device of claim 1, wherein the input unit includes a seventh transistor having a first electrode connected to the gate start signal or the carry signal, a second electrode connected to the Q1 node, and a gate electrode connected to the gate clock signal.

8. The display device of claim 1, wherein the first level voltage is higher than the second level voltage.

9. A display device comprising:

a display panel on which pixels are disposed;

a gate driver configured to apply a gate signal to the pixels through a gate line;

a data driver configured to apply a data voltage to the pixel through a data line; and a timing controller configured to control operations of the gate driver and the data driver, wherein the gate driver includes a plurality of stage circuits, each of the plurality of stage circuits including:

an output unit configured to output a first level voltage or a second level voltage to the gate line according to a voltage at a Q node and a voltage at a QB node;

an input unit configured to control a voltage at a Q1 node according to a gate start signal or a carry signal output from a previous stage circuit in response to a gate clock signal;

a Q node controller configured to control the voltage at the Q node according to the voltage at the Q1 node;

a QB node controller configured to control the voltage at the QB node according to the voltage at the Q1 node and the voltage at the Q node; and a reset unit configured to set the Q1 node to the second level voltage in response to the voltage at the Q node, wherein the reset unit includes a first transistor having a first electrode connected to the second level voltage, a second electrode directly connected to the Q1 node, and a gate electrode connected to the Q node, wherein the Q node controller includes a second transistor connected between the Q1 node and the Q node and having a gate electrode connected to the second level voltage, and wherein the first transistor is turned on in response to the voltage of the Q node and controls a gate-source voltage of the second transistor which controls the voltage of the Q node.

10. The display device of claim 9, wherein the timing controller is configured to control the gate driver and the data driver to operate in a low-speed driving mode, and the low-speed driving mode is composed of a refresh period during which a new data voltage is programmed to the pixel and a skip period during which the programming is omitted.

11. The display device of claim 10, wherein the second level voltage is output to the gate line in response to the voltage at the Q node during the skip period of the low-speed driving mode.

12. The display device of claim 10, wherein during the skip period of the low-speed driving mode, the second level voltage is applied to the Q1 node through the first transistor in response to the voltage at the Q node, the gate-source voltage of the second transistor is set to 0 V, and the voltage at the Q node is maintained at the second level voltage.

13. The display device of claim 10, wherein the first transistor is configured to remove noise applied to the Q1 node through a gate start pulse or the carry signal at the second level voltage.

14. The display device of claim 9, wherein the first level voltage is higher than the second level voltage.

15. A display device comprising:

a plurality of stage circuits configured to output gate signals to gate lines in response to a gate clock signal, wherein each of the plurality of stage circuits includes:

an output unit configured to output a voltage to one of the gate lines according to at least one of a corresponding voltage at a Q node and a corresponding voltage at a QB node;

an input unit configured to control a voltage at a Q1 node according to a gate start signal or a carry signal output from a previous stage circuit in response to the gate clock signal;

a Q node controller configured to control the voltage at the Q node according to the voltage at the Q1 node;

a QB node controller configured to control the voltage at the QB node according to the voltage at the Q1 node and the voltage at the Q node; and a reset unit configured to change the voltage at the Q1 node in response to the voltage at the Q node, wherein the reset unit includes a first transistor having a first electrode connected to a driving voltage, a second electrode directly connected to the Q1 node, and a gate electrode connected to the Q node, wherein the Q node controller includes a second transistor connected between the Q1 node and the Q node and having a gate electrode connected to the driving voltage, and wherein the first transistor is turned on in response to the voltage of the Q node and controls a gate-source voltage of the second transistor which controls the voltage of the Q node.

16. The display device of claim 15, wherein the output unit comprises:

a third transistor configured to output a first value as the voltage to the one of the gate lines according to the voltage at the Q node; and a fourth transistor configured to output a second value as the voltage to the one of the gate lines according to the voltage at the QB node.

* * * * *